US012809609B2

(12) United States Patent
Ivanova et al.

(10) Patent No.: US 12,809,609 B2
(45) Date of Patent: Nov. 24, 2026

(54) CONFIGURING PLATFORM SERVICES ASSOCIATED WITH A CONTAINER ORCHESTRATION SYSTEM

(71) Applicant: VMware LLC, Palo Alto, CA (US)

(72) Inventors: Elena Ivanova, Sofia (BG); Slav Danchev, Sofia (BG)

(73) Assignee: VMware LLC, Palo Alto, CA (US)

( * ) Notice: Subject to any disclaimer, the term of this patent is extended or adjusted under 35 U.S.C. 154(b) by 329 days.

(21) Appl. No.: 18/217,173

(22) Filed: Jun. 30, 2023

(65) Prior Publication Data

US 2025/0004743 A1 Jan. 2, 2025

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/71; G06F 8/65
See application file for complete search history.

(56) References Cited

U.S. PATENT DOCUMENTS

2017/0200113 A1* 7/2017 Cherkasova .......... G06F 9/5072
2017/0228676 A1* 8/2017 Cherkasova ..... G06Q 10/06313
2020/0228402 A1* 7/2020 Parker ....................... G06F 9/54
2021/0055947 A1* 2/2021 Mahajan ............. G06F 9/45558
2021/0157305 A1* 5/2021 Ratilla ............... G05B 19/4183
2022/0114003 A1 4/2022 Okman et al.
2023/0188613 A1* 6/2023 Velammal ................. G06F 8/72
709/203
2024/0028488 A1* 1/2024 Balcha ................ G06F 11/1461
2024/0211227 A1* 6/2024 Johnson .................... G06F 8/60

FOREIGN PATENT DOCUMENTS

CN 109062655 B 5/2021
CN 113204353 A * 8/2021 ............... G06F 8/63
CN 116208498 A 6/2023
CN 113486362 B * 10/2023
WO 2022037612 A1 2/2022

* cited by examiner

*Primary Examiner* — Phillip H Nguyen
(74) *Attorney, Agent, or Firm* — Kim & Stewart LLP

(57) ABSTRACT

A request to configure a platform service associated with a container orchestration system can be received. A plurality of ConfigMaps can be collected from a deployment chart of an application service managed by the container orchestration system. Each of the plurality of ConfigMaps can include platform service configuration data associated with a different version of the platform service. One of the plurality of ConfigMaps can be selected based on a current version of the platform service, and the platform service can be configured using the selected ConfigMap.

20 Claims, 4 Drawing Sheets

CONFIGURING PLATFORM SERVICES ASSOCIATED WITH A CONTAINER ORCHESTRATION SYSTEM

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

Figure 1A:
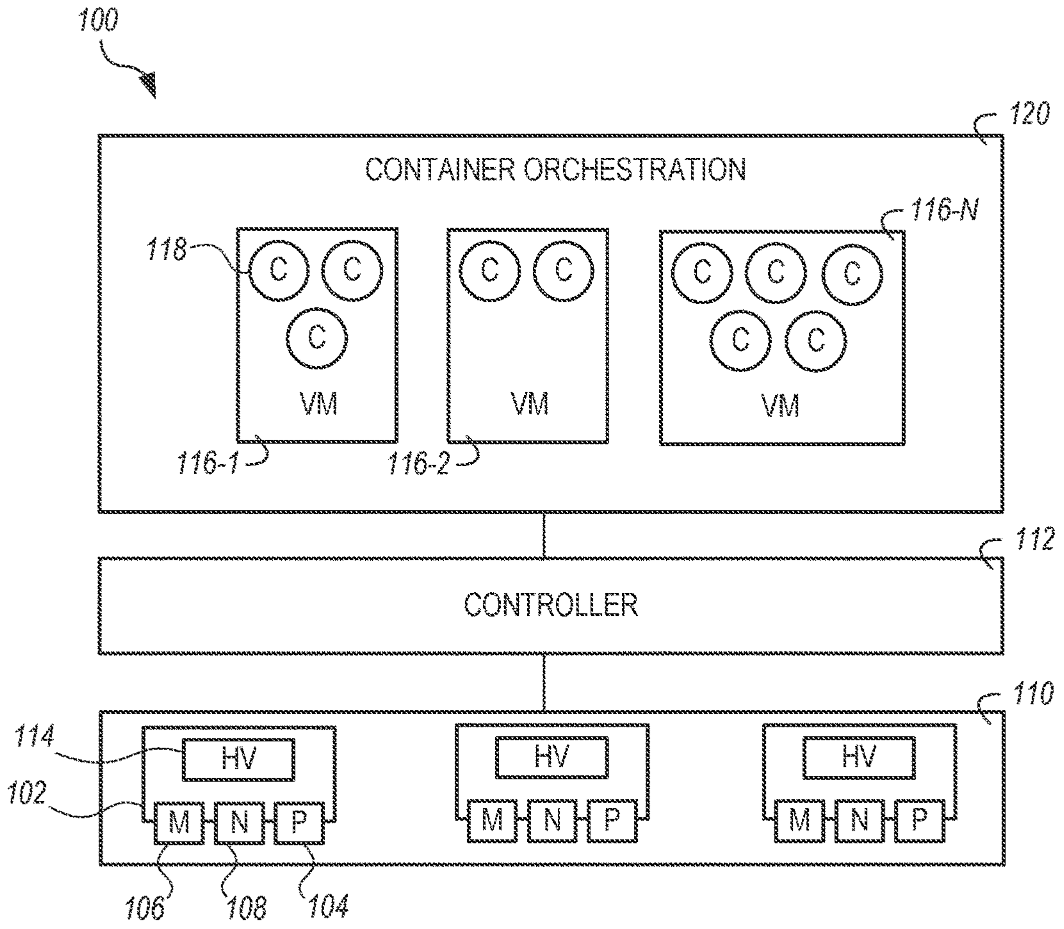
FIG. 1A is a diagram of an example of a container orchestration as an application in a system for configuring platform services associated with a container orchestration system in accordance with a number of embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes (which may be referred to herein simply as "nodes"). Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use namespaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

Services, as used herein, refers to services provided by a container orchestration system (e.g., nodes, pods, containers, namespaces, etc.). Particular instances of services may be referred to herein as "service instances." "Types of service instances" or "service instance types" may alternately refer generally to "services." An example of a service instance may be a particular container, "container 8j809fsjag" of the service instance type "container." A container orchestration system can manage multiple applications with shared services between the applications. A container orchestration system can be responsible for application deployment, scaling, and management, such as maintenance and updates of the applications and/or services. One example of a container orchestration system is Kubernetes, however, embodiments of the present disclosure are not so limited. The container orchestration system can manage a container cluster (sometimes referred to herein simply as "cluster").

An application service, as referred to herein, is a service running in and managed by a container orchestration system (e.g., a container orchestration system runtime). An application service may be deployed with a deployment chart (e.g., a Helm chart). An application service can have a lifecycle defined by a container orchestration system runtime. An application service can be considered to be a microservice in a product based on microservices.

A platform service, as referred to herein, is a service that is part of a platform on which the container orchestration system has been deployed. A platform service runs outside of the runtime of the container orchestration system. In some embodiments, a platform service is a Linux service. A platform service has a lifecycle defined by the operating system and serves cross-cutting concerns to multiple application services. A log management service that deals with rotating, compressing, and/or deleting service logs is an example of a platform service.

In a microservices-based product deployed on-premises it may be common to have a set of platform services running outside of Kubernetes runtime to provide functionality to the application services running inside Kubernetes runtime. In such a setup, the configuration of the platform service depends on the current set of application services deployed and whatever requirements those applications services may have. This relationship leads to a dependency between the application services and the platform services. This dependency can cause challenges because platform services may not be aware of the nature, the number, or the current versions of the various application services. In addition, the lifecycles of platform services and application services are different and disconnected. As a result, it may be difficult to set the correct configuration of the platform services because the configuration may depend on the application services that are going to be deployed. In previous approaches, for instance, it may be prohibitively difficult to upgrade the two types of services independently because of their strong coupling.

Embodiments of the present disclosure can dynamically configure platform services based on configuration bundled as part of application service deployment charts. In some embodiments, for instance, platform configurations are defined as Kubernetes ConfigMaps and are distributed together with an application service in a deployment chart. Once the ConfigMaps are deployed in Kubernetes as part of starting an application service, they can be collected by a dedicated platform service (referred to herein as an "applicator") that can update the configurations of any related platform services. An applicator can be a script in some embodiments and can be associated with a platform service on a one-to-one basis, for instance. As described further below, ConfigMaps are versioned and provide the platform versions to which they are applicable. The applicator can filter the available configurations and apply the latest configuration applicable to the current platform version.

Multiple ConfigMap configurations for the same platform service and the same application service can be deployed in the same Kubernetes runtime to accommodate different platform service versions. Accordingly, each ConfigMap is provided a unique name. In some embodiments, for instance, ConfigMap names can include three portions: a first portion that includes an identifier (e.g., a name) of the application service, a second portion that includes an identifier (e.g., a number) of a current version of the application service, and a third portion that includes an identifier (e.g., a name) of the platform service. In an example, "provisioning-service-logrotate-conf-8.8.0" is a name of a ConfigMap that identifies the application service (provisioning-service), the current version of the application service (8.8.0), and the platform service (logrotate) the configuration is associated with (e.g., intended for). ConfigMaps can be bundled with the application service deployment chart and can be deployed at the Kubernetes runtime.

Embodiments herein include an annotation referred to as "minimal-platform-version" in each ConfigMap that defines the minimal version of the platform service to which the configuration in the ConfigMap is applicable. If, for example, a platform service is upgraded to a newer version, it may no longer support some of the configurations it previously supported. In such an instance, an updated application service configuration may be needed for that version of the platform service.

When the application services have been deployed in the Kubernetes runtime along with their configurations for the platform services they use, the applicator can select the appropriate configurations and apply them to the platform service(s). The applicator can receive a mapping between the platform services to be configured and the ConfigMaps available to them. As previously discussed, multiple ConfigMaps may be available for each platform service. The applicator can select a ConfigMap with the most recent version in the minimal-platform-version annotation, which is also older or equal to the current platform version. Stated differently, embodiments herein can determine a minimal-platform-version for each ConfigMap that corresponds to a particular platform service, discard any ConfigMap having a minimal-platform-version that exceeds the current version of the platform service, and select, from the remaining ConfigMaps, a ConfigMap having a largest minimal-platform-version. The applicator can parse the configurations from the selected ConfigMap and apply them to the corresponding platform services (e.g., by writing data from ConfigMap(s) to configuration file(s) of the platform service(s)).

Embodiments of the present disclosure do not require a platform update when a service is updated, even if the service needs to update service-related configuration of shared platform services. Updates to the platform service configurations are delivered with the updated application service that utilizes them. Embodiments herein also automatically deploy and/or delete configurations as part of deploying/deleting application services (e.g., via Helm). In contrast with previous approaches discussed above, the determination of whether to update the platform can be independent of the determination of whether to update the Kubernetes services.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 228 may reference element "28" in FIG. 2, and a similar element may be referenced as 928 in FIG. 9. Analogous elements within a Figure may be referenced with a hyphen and extra numeral or letter. Such analogous elements may be generally referenced without the hyphen and extra numeral or letter. For example, elements 116-1, 116-2, and 116-N in FIG. 1A may be collectively referenced as 116. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1A is a diagram of an example of a container orchestration as an application in a system 100 for configuring platform services associated with a container orchestration system in accordance with a number of embodiments of the present disclosure. The system 100 can include hosts 102 with processing resources 104 (e.g., a number of processors), memory resources 106, and/or a network interface 108. The hosts 102 can be included in a software defined data center 110. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API), which can be provided by a controller 112. The hosts 102 can be in communication with the controller 112. In some embodiments, the controller 112 can be a server, such as a web server.

The hosts 102 can incorporate a hypervisor 114 that can execute a number of virtual computing instances 116-1, 116-2, . . . , 116-N (referred to generally herein as "VCIs 116"). The VCIs can be provisioned with processing resources 104 and/or memory resources 106 and can communicate via the network interface 108. The processing resources 104 and the memory resources 108 provisioned to the VCIs can be local and/or remote to the hosts 102. For example, in a software defined data center, the VCIs 116 can be provisioned with resources that are generally available to the software defined data center and not tied to any particular hardware device. By way of example, the memory resources 106 can include volatile and/or non-volatile memory available to the VCIs 116. The VCIs 116 can be moved to different hosts (not specifically illustrated), such that a different hypervisor 114 manages the VCIs 116.

In the example illustrated in FIG. 1A, the VCIs 116 are virtual machines ("VMs") that each include a container virtualization layer to provision a number of containers 118. With respect to the virtual machines 116, the hosts 102 can be regarded as virtual machine hosts. With respect to the containers provisioned from container images provided by a virtual machine (e.g., virtual machine 116-1), the virtual machine 116 and the container virtualization layer can be regarded as a container host. In FIG. 1A, the controller 112 hosts the container orchestration system 120 (e.g., a container cluster) as an application.

Figure 1B:
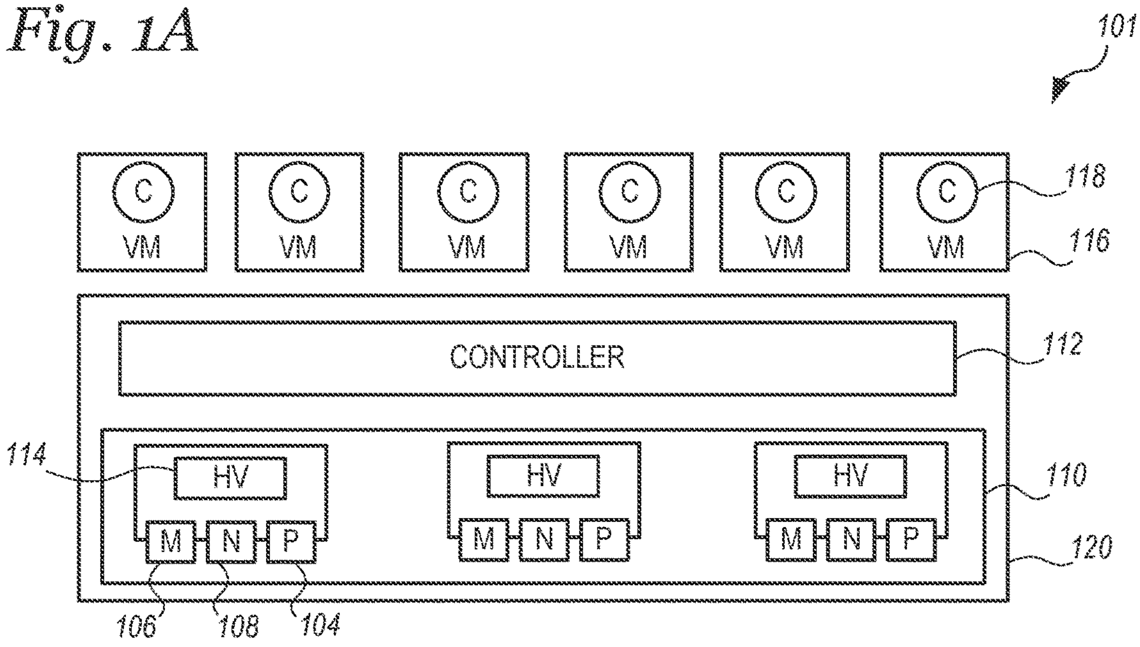
FIG. 1B is a diagram of an example of integrated container orchestration in a system for configuring platform services associated with a container orchestration system in accordance with a number of embodiments of the present disclosure.

FIG. 1B is a diagram of an example of integrated container orchestration in a system 101 for configuring platform services associated with a container orchestration system in accordance with a number of embodiments of the present disclosure. FIG. 1B is analogous to FIG. 1A, except that the container orchestration system 120 and the controller 112 are an embedded system. Furthermore, the virtual machines 116 can be referred to as pod virtual machines that each host a container 118. A pod is the smallest deployable unit of computing that can be created and managed by the container orchestration system 120. In contrast, in FIG. 1A, each VM 116 can provision a number of pods. In some embodiments, the container orchestration system can be a third-party system not managed by the controller 112.

Figure 2:
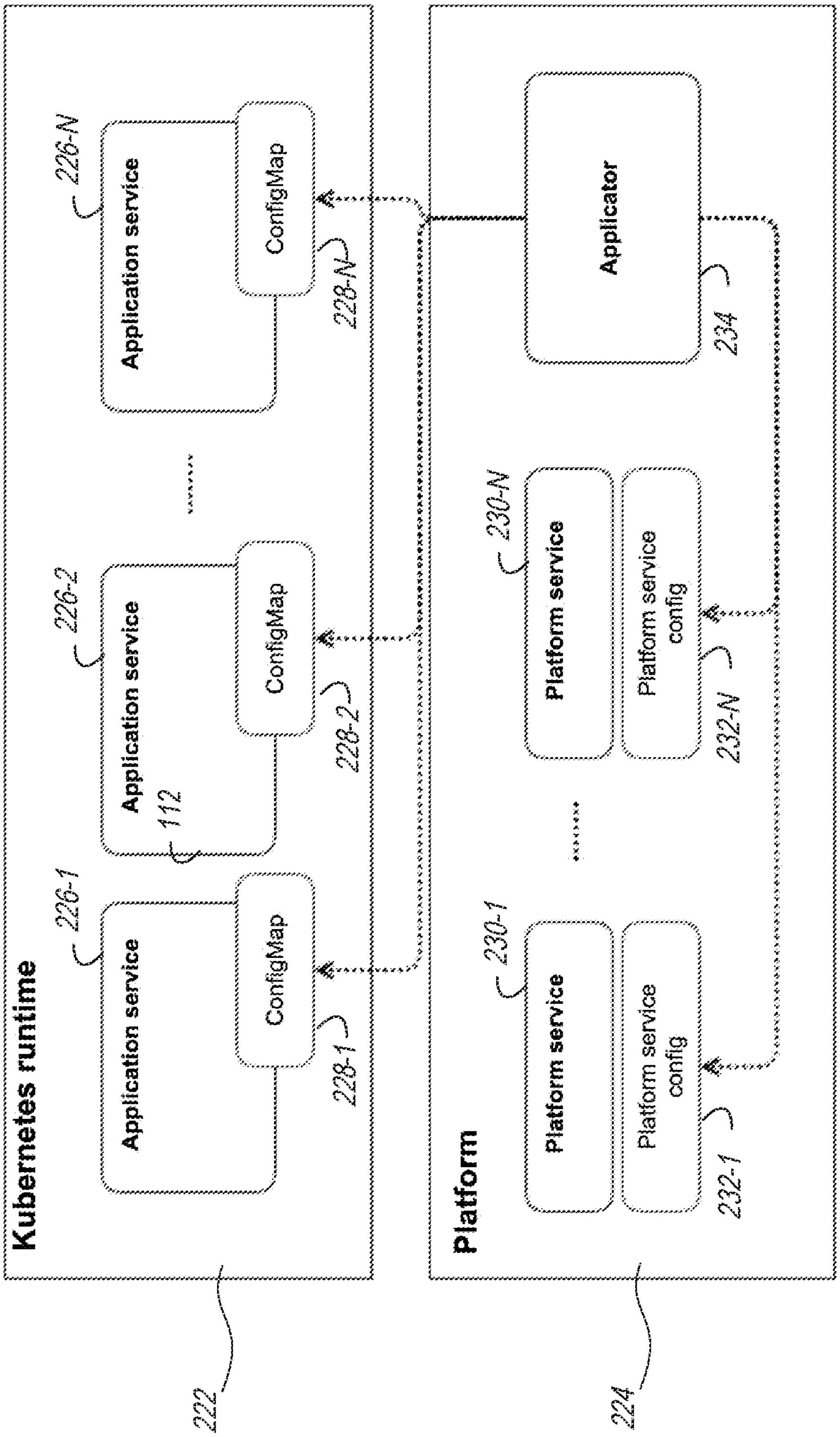
FIG. 2 is a block diagram illustrating a system for configuring platform services associated with a container orchestration system in accordance with a number of embodiments of the present disclosure.

FIG. 2 is a block diagram illustrating a system for configuring platform services associated with a container orchestration system in accordance with a number of embodiments of the present disclosure. As shown in FIG. 2, the system includes a Kubernetes runtime 222 and a platform 224. The Kubernetes runtime 222 can include a number of application services 226-1, 226-2, . . . , 226-N (referred to generally herein as "application services 226"). The application services 226 can include a number of ConfigMaps 228-1, 228-2, . . . , 228-N (referred to generally herein as "ConfigMaps 228"). Although one ConfigMap is shown in association with each of the application services 226, embodiments herein are not so limited.

The platform 224 can include a number of platform services 230-1, . . . , 230-N (referred to generally herein as "platform services 230"). As discussed herein, an applicator 234 on the platform 224 can receive the ConfigMaps 228 from the application services 226 and use the ConfigMaps 228 to configure the platform services 230.

Figure 3:
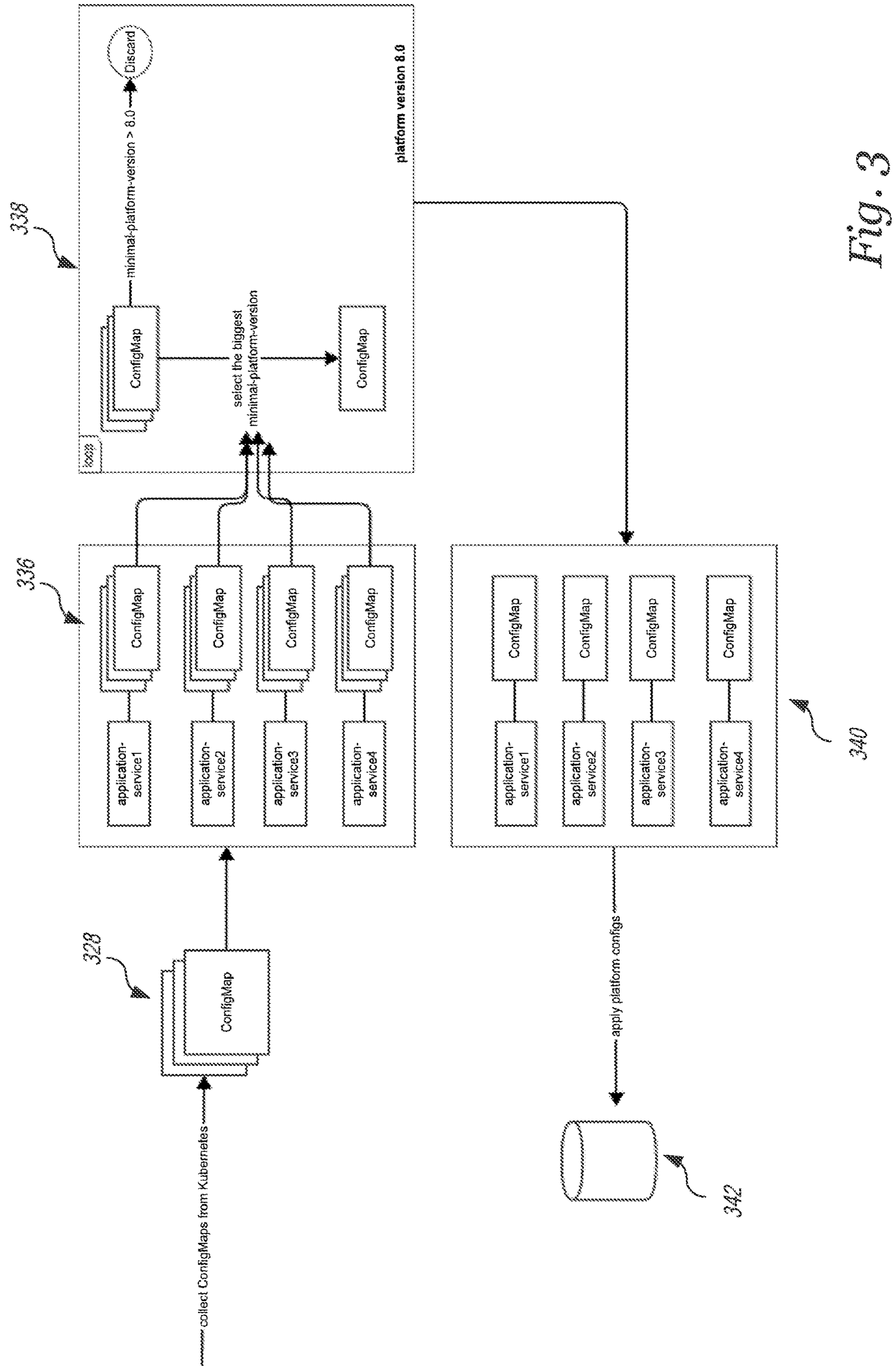
FIG. 3 is a flow diagram associated with configuring platform services associated with a container orchestration system in accordance with a number of embodiments of the present disclosure.

FIG. 3 is a flow diagram associated with configuring platform services associated with a container orchestration system in accordance with a number of embodiments of the present disclosure. At 328, the applicator can collect a number of ConfigMaps from Kubernetes for applicable platform services. At 336, the applicator can determine mappings between the ConfigMaps and the application services. As shown, each application service can be associated with more than one ConfigMap. As previously discussed, the different ConfigMaps can correspond to different versions of a given platform service. At 338, the applicator can determine a minimal-platform-version for each ConfigMap that corresponds to a particular platform service, discard any ConfigMap having a minimal-platform-version that exceeds the current version of the platform service, and select, from the remaining ConfigMaps, a ConfigMap having a largest minimal-platform-version. The ConfigMap having the largest minimal-platform-version can be considered the most recent platform version that is compatible with the platform service. In the example illustrated in FIG. 3, the current platform version is 8.0. Therefore, any ConfigMap having a minimal-platform-version greater than 8.0 can be discarded. As shown at 340, a one-to-one relationship between application services and ConfigMaps is created. The applicator can parse the configurations from the selected ConfigMap(s) and apply them to the corresponding platform services (e.g., by writing data from ConfigMap(s) to configuration file(s) of the platform service(s)). As shown in FIG. 3, those ConfigMaps shown at 340 can be written to the configuration file 342 of the platform service for configuring the platform service. An example ConfigMap for a platform service called "logrotate" can be:

```
apiVersion: v1
kind: ConfigMap
metadata:
  name: cmx-service-logrotate-conf-8.8.0
  annotations:
    minimal-platform-version: "8.8.0"
  labels:
    app: cmx-service-app
    logrotate-conf: "true"
  data:
    logrotate: |
    /var/log/services-logs/prelude/cmx-service-apps/console-logs/*.log{
    }
```

Figure 4:
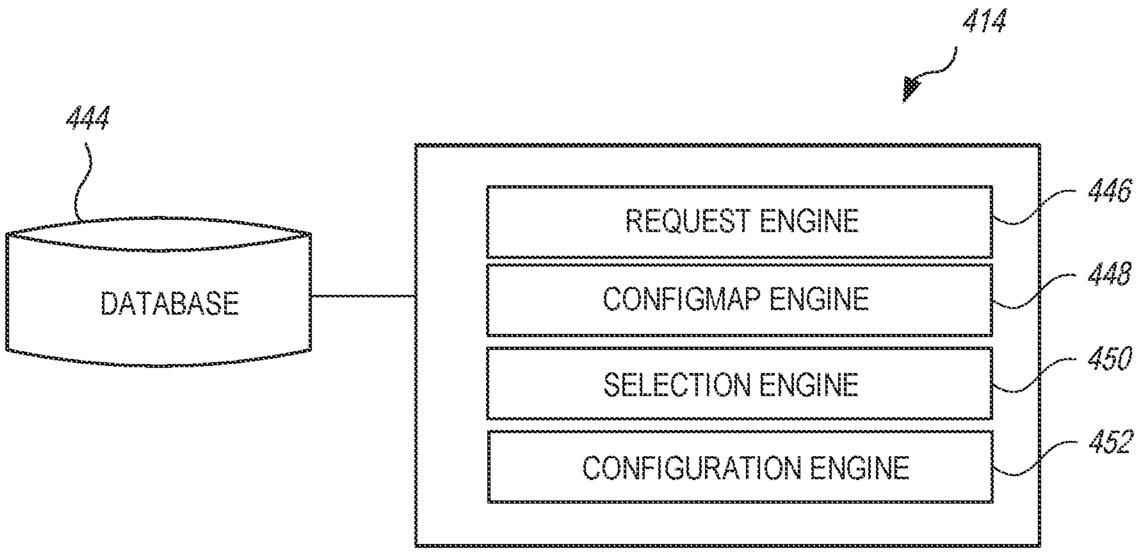
FIG. 4 is a diagram of a system for configuring platform services associated with a container orchestration system in accordance with a number of embodiments of the present disclosure.

FIG. 4 is a diagram of a system 414 for configuring platform services associated with a container orchestration system in accordance with a number of embodiments of the present disclosure. The system 414 can include a database 444 and/or a number of engines, for example request engine 446, ConfigMap engine 448, selection engine 450, configuration engine 452446 and can be in communication with the database 444 via a communication link. The system 414 can include additional or fewer engines than illustrated to perform the various functions described herein. The system can represent program instructions and/or hardware of a machine (e.g., machine 554 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 446 can include a combination of hardware and program instructions that is configured to receive a request to configure a platform service associated with a container orchestration system. In some embodiments, the ConfigMap engine 448 can include a combination of hardware and program instructions that is configured to collect a plurality of ConfigMaps from a deployment chart of an application service managed by the container orchestration system, wherein each of the plurality of ConfigMaps includes platform service configuration data associated with a different version of the platform service. In some embodiments, the selection engine 450 can include a combination of hardware and program instructions that is configured to select one of the plurality of ConfigMaps based on a current version of the platform service. In some embodiments, the configuration engine 452 can include a combination of hardware and program instructions that is configured to configure the platform service using the selected ConfigMap.

Figure 5:
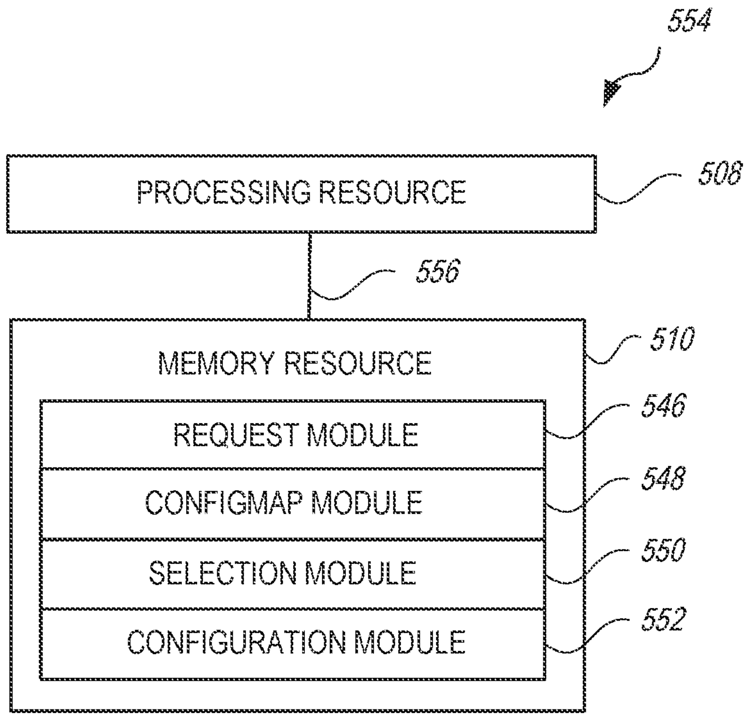
FIG. 5 is a diagram of a machine for configuring platform services associated with a container orchestration system in accordance with a number of embodiments of the present disclosure.

FIG. 5 is a diagram of a machine 554 for configuring platform services associated with a container orchestration system in accordance with a number of embodiments of the present disclosure. The machine 554 can utilize software, hardware, firmware, and/or logic to perform a number of functions. The machine 554 can be a combination of hardware and program instructions configured to perform a number of functions (e.g., actions). The hardware, for example, can include a number of processing resources 508 and a number of memory resources 510, such as a machine-readable medium (MRM) or other memory resources 510. The memory resources 510 can be internal and/or external to the machine 554 (e.g., the machine 554 can include internal memory resources and have access to external memory resources). In some embodiments, the machine 554 can be a VCI. The program instructions (e.g., machine-readable instructions (MRI)) can include instructions stored on the MRM to implement a particular function (e.g., an action such as providing a notification, as described herein). The set of MRI can be executable by one or more of the processing resources 508. The memory resources 510 can be coupled to the machine 554 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 556. The communication path 556 can be local or remote to the machine 554. Examples of a local communication path 556 can include an electronic bus internal to a machine, where the memory resources 510 are in communication with the processing resources 508 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 556 can be such that the memory resources 510 are remote from the processing resources 508, such as in a network connection between the memory resources 510 and the processing resources 508. That is, the communication path 556 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 546, 548, 550, 552 that when executed by the processing resources 508 can perform a number of functions. As used herein a module includes a set of instructions included to perform a particular task or action. The number of modules 546, 548, 550, 552 can be sub-modules of other modules. For example, the configuration module 552 can be a sub-module of the selection module 550 and/or can be contained within a single module. Furthermore, the number of modules 546, 548, 550, 552 can comprise individual modules separate and distinct from one another. Examples are not limited to the specific modules 546, 548, 550, 552 illustrated in FIG. 5.

Each of the number of modules 546, 548, 550, 552 can include program instructions and/or a combination of hardware and program instructions that, when executed by a processing resource 508, can function as a corresponding engine as described with respect to FIG. 4. For example, the request module 546 can include program instructions and/or a combination of hardware and program instructions that, when executed by a processing resource 508, can function as the request engine 446, though embodiments of the present disclosure are not so limited.

The machine 554 can include a request module 546, which can include instructions to receive a request to configure a platform service associated with a container orchestration system. The machine 554 can include a ConfigMap module 548, which can include instructions to collect a plurality of ConfigMaps from a deployment chart of an application service managed by the container orchestration system, wherein each of the plurality of ConfigMaps includes platform service configuration data associated with a different version of the platform service. The machine 554 can include a selection module 550, which can include instructions to select one of the plurality of ConfigMaps based on a current version of the platform service. The machine 554 can include a configuration module 552, which can include instructions to configure the platform service using the selected ConfigMap.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:

receive a request to configure a platform service associated with a container orchestration system that includes a plurality of pod virtual machines each of which hosts one or more containers and manages deployment of an application service that runs in the one or more containers of the pod virtual machines;

collect a plurality of configurations corresponding to the platform service, from a deployment chart of the application service managed by the container orchestration system, wherein each of the plurality of configurations includes platform service configuration data associated with a particular version of the platform service;

select one of the plurality of configurations based on a current version of the platform service;

configure the platform service using the selected configuration, wherein the instructions to configure the platform service using the selected configuration include instructions to write platform service configuration data from the selected configuration to a configuration file of the platform service; and cause the application service to run in the one or more containers of the pod virtual machines in accordance with the platform service configuration data written in the configuration file.

2. The medium of claim 1, wherein the request is received in association with an upgrade of the platform service.

3. The medium of claim 1, wherein the deployment chart is a Helm chart.

4. The medium of claim 1, wherein each of the plurality of configurations has a unique name.

5. The medium of claim 4, wherein the unique name includes at least three portions.

6. The medium of claim 5, wherein the at least three portions include:

a first portion including an identifier of the application service;

a second portion including an identifier of a current version of the application service; and a third portion including an identifier of the platform service.

7. The medium of claim 1, wherein the instructions to select one of the plurality of configurations based on the version of the platform service include instructions to discard versions of the configurations larger than the current version of the platform service.

8. The medium of claim 1, wherein the selected configuration is a largest version that does not exceed the current version of the platform service.

9. A method, comprising:

receiving a request to configure a platform service associated with a container orchestration system that includes a plurality of pod virtual machines each of which hosts one or more containers and manages deployment of an application service that runs in the one or more containers of the pod virtual machines;

collecting a plurality of configurations from a deployment chart of the application service managed by the container orchestration system, wherein each of the plurality of configurations includes platform service configuration data associated with a different version of the platform service;

selecting one of the plurality of configurations based on a current version of the platform service;

configuring the platform service using the selected configuration, wherein said configuring the platform service using the selected configuration include writing platform service configuration data from the selected configuration to a configuration file of the platform service; and causing the application service to run in the one or more containers of the pod virtual machines in accordance with the platform service configuration data written in the configuration file.

10. The method of claim 9, wherein the method includes receiving the request in association with an upgrade of the platform service.

11. The method of claim 9, wherein each of the plurality of configurations has a unique name.

12. The method of claim 11, wherein the unique name includes at least three portions, including:

a first portion including an identifier of the application service;

a second portion including an identifier of a current version of the application service; and a third portion including an identifier of the platform service.

13. The method of claim 9, wherein selecting one of the plurality of configurations based on the version of the platform service includes discarding versions of the configurations larger than the current version of the platform service.

14. The method of claim 9, wherein the selected configuration is a largest version that does not exceed the current version of the platform service.

15. A system, comprising:

a request engine configured to receive a request to configure a platform service associated with a container orchestration system that includes a plurality of pod virtual machines each of which hosts one or more containers and manages deployment of an application service that runs in the one or more containers of the pod virtual machines;

a configuration engine configured to collect a plurality of configurations from a deployment chart of the application service managed by the container orchestration system, wherein each of the plurality of configurations includes platform service configuration data associated with a different version of the platform service;

a selection engine configured to select one of the plurality of configurations based on a current version of the platform service; and a configuration engine configured to configure the platform service using the configuration through wiring of platform service configuration data from the selected configuration to a configuration file of the platform service, and cause the application service to run in the one or more containers of the pod virtual machines in accordance with the platform service configuration data written in the configuration file.

16. The system of claim 15, wherein the selection engine is configured to discard versions of the configurations larger than the current version of the platform service.

17. The system of claim 15, wherein the selected configuration is a largest version that does not exceed the current version of the platform service.

18. The system of claim 15, wherein the request engine is configured to receive the request in association with an upgrade of the platform service.

19. The system of claim 15, wherein each of the plurality of configurations has a unique name.

20. The system of claim 19, wherein the unique name includes at least three portions, including:

a first portion including an identifier of the application service;

a second portion including an identifier of a current version of the application service; and a third portion including an identifier of the platform service.

* * * * *